US012787986B2

(12) United States Patent
Buzzard et al.

(10) Patent No.: US 12,787,986 B2
(45) Date of Patent: Nov. 10, 2026

(54) BIRD STATION

(71) Applicant: Bird Buddy Inc., New Castle, DE (US)

(72) Inventors: Kyle Buzzard, Vicksburg, MI (US); Franci Zidar, Ljubljana (SI); Cyrus Johnson, Carlsbad, CA (US)

(73) Assignee: BIRD BUDDY, INC., New York, NY (US)

( * ) Notice: Subject to any disclaimer, the term of this patent is extended or adjusted under 35 U.S.C. 154(b) by 0 days.

(21) Appl. No.: 18/964,359

(22) Filed: Nov. 30, 2024

(65) Prior Publication Data

US 2025/0120369 A1 Apr. 17, 2025

Related U.S. Application Data

(63) Continuation of application No. 18/170,848, filed on Feb. 17, 2023, now abandoned.

(Continued)

(30) Foreign Application Priority Data

Mar. 17, 2022 (GB) ...................................... 2203726
Mar. 17, 2022 (GB) ...................................... 2203727

(51) Int. Cl.
*A01K 31/00* (2006.01)
*A01K 31/12* (2006.01)
*A01K 39/014* (2006.01)

(52) U.S. Cl.
CPC ............ *A01K 31/12* (2013.01); *A01K 39/014* (2013.01)

(58) Field of Classification Search
CPC ......... A01K 31/12; A01K 31/14; A01K 39/00; A01K 39/01; A01K 39/0106; A01K 39/0113; A01K 39/012; A01K 39/014
See application file for complete search history.

(56) References Cited

U.S. PATENT DOCUMENTS 1,181,045 A 4/1916 Tessier
1,994,859 A 3/1935 Conrad
(Continued)

FOREIGN PATENT DOCUMENTS

AU 2018310754 A1 2/2020
CA 223049 5/2024
(Continued)

OTHER PUBLICATIONS

Lowe, "Distinctive Image Features from Scale-Invariant Keypoints", 28 pages, Jan. 5, 2004.
(Continued)

*Primary Examiner* — Joshua J Michener
*Assistant Examiner* — Henry Hooper Mudd
(74) *Attorney, Agent, or Firm* — Lando & Anastasi, LLP

(57) ABSTRACT

A system comprising an electronic control module and a plurality of bird stations. Each bird station comprising a respective housing having a recess provided therein, the recess being configured to receive the electronic control module therein, and a respective one or more solar panels mounted on the bird station and detachably connectable to the electronic control module when the electronic control module has been inserted into the recess of the housing of the bird station, where the respective one or more solar panels are configured to provide electrical power to the electronic control module when the electronic control module is in the recess and connected to the respective one or more solar panels.

15 Claims, 7 Drawing Sheets

Related U.S. Application Data

(60) Provisional application No. 63/314,005, filed on Feb. 25, 2022.

(56) References Cited

U.S. PATENT DOCUMENTS

| | | | |
|---|---|---|---|
| 2,504,282 | A | 4/1950 | Tobias |
| 3,017,859 | A | 1/1962 | Leonard |
| 3,484,013 | A | 12/1969 | Speicher |
| 3,913,527 | A | 10/1975 | Kilham |
| D239,182 | S | 3/1976 | Kilbaum |
| D266,620 | S | 10/1982 | Krech |
| 4,434,745 | A | 3/1984 | Perkins |
| D277,988 | S | 3/1985 | Kilham |
| D278,167 | S | 3/1985 | Kilham |
| 5,063,877 | A | 11/1991 | Riggi |
| D342,590 | S | 12/1993 | Bransky |
| 5,479,879 | A | 1/1996 | Biek |
| D376,446 | S | 12/1996 | Kerr |
| D376,877 | S | 12/1996 | Hardison |
| D380,066 | S | 6/1997 | Green |
| D380,878 | S | 7/1997 | Brown |
| 5,711,248 | A | 1/1998 | Boyd |
| D398,722 | S | 9/1998 | Hardison |
| 5,806,460 | A | 9/1998 | Klein |
| 5,996,127 | A | 12/1999 | Leslie |
| 6,276,298 | B1 | 8/2001 | Welsh |
| D451,251 | S | 11/2001 | Chrisco |
| 6,499,430 | B2 | 12/2002 | Garcia-lucio |
| 6,535,131 | B1 | 3/2003 | Bar-shalom |
| 6,546,368 | B1 | 4/2003 | Weninger |
| D479,134 | S | 9/2003 | Murata |
| D485,022 | S | 1/2004 | Green |
| D485,397 | S | 1/2004 | Green |
| D485,398 | S | 1/2004 | Green |
| 6,672,249 | B2 | 1/2004 | Garcia-lucio |
| 6,792,891 | B1 | 9/2004 | Coburn |
| D497,293 | S | 10/2004 | Cheng |
| 6,803,945 | B1 | 10/2004 | Needham |
| D523,184 | S | 6/2006 | Colvin |
| D524,490 | S | 7/2006 | Obenshain |
| 7,234,418 | B2 | 6/2007 | Fort, II |
| D563,584 | S | 3/2008 | Lee |
| D612,548 | S | 3/2010 | Campbell |
| D633,659 | S | 3/2011 | Lai |
| D646,027 | S | 9/2011 | Colwell |
| 8,061,746 | B1 | 11/2011 | Stephens, III |
| D674,562 | S | 1/2013 | Hoysak |
| D676,614 | S | 2/2013 | Fields |
| D683,909 | S | 6/2013 | Muhr |
| D683,912 | S | 6/2013 | Muhr |
| D698,098 | S | 1/2014 | Muhr |
| D698,102 | S | 1/2014 | Muhr |
| D698,103 | S | 1/2014 | Muhr |
| D698,501 | S | 1/2014 | Muhr |
| D700,134 | S | 2/2014 | Fallon |
| 8,869,743 | B2 | 10/2014 | Cruz |
| D721,208 | S | 1/2015 | Chen |
| 8,954,173 | B1 | 2/2015 | Fischer |
| D725,316 | S | 3/2015 | Carter |
| 8,978,586 | B1 | 3/2015 | Carter |
| D744,172 | S | 11/2015 | Donegan |
| 9,247,719 | B1 | 2/2016 | Bennett et al. |
| 9,572,304 | B2 | 2/2017 | Harari |
| D788,381 | S | 5/2017 | Krueger |
| D788,382 | S | 5/2017 | Krueger |
| D788,383 | S | 5/2017 | Donegan |
| D788,384 | S | 5/2017 | Patrick |
| D789,621 | S | 6/2017 | Nifong |
| D799,756 | S | 10/2017 | Fox |
| D808,085 | S | 1/2018 | Bartz |
| D809,717 | S | 2/2018 | Pritham |
| D813,466 | S | 3/2018 | Tang |
| D814,715 | S | 4/2018 | Fox |
| D816,250 | S | 4/2018 | Wang |
| 9,961,885 | B2 | 5/2018 | Bennett et al. |
| D819,895 | S | 6/2018 | Smith |
| D836,851 | S | 12/2018 | Bartz |
| 10,212,921 | B1 | 2/2019 | Plemmons |
| D852,738 | S | 7/2019 | Backett |
| D862,802 | S | 10/2019 | Nifong |
| 10,499,618 | B2 | 12/2019 | Klein |
| D872,377 | S | 1/2020 | Haney |
| D872,378 | S | 1/2020 | Haney |
| D872,947 | S | 1/2020 | Haney |
| D872,948 | S | 1/2020 | Haney |
| D872,949 | S | 1/2020 | Haney |
| 10,531,644 | B2 | 1/2020 | Cote |
| D874,740 | S | 2/2020 | Haney |
| D875,325 | S | 2/2020 | Haney |
| 10,609,908 | B2 | 4/2020 | Donegan |
| D891,201 | S | 7/2020 | Steenwyk |
| D896,863 | S | 9/2020 | Tu |
| D899,010 | S | 10/2020 | Yagen |
| D899,703 | S | 10/2020 | Shen |
| 10,796,141 | B1 | 10/2020 | Shepherd, Jr. |
| D901,376 | S | 11/2020 | Lu |
| D903,207 | S | 11/2020 | Shen |
| D917,792 | S | 4/2021 | Thorn |
| D935,110 | S | 11/2021 | Toellner |
| D935,550 | S | 11/2021 | Wang |
| D938,081 | S | 12/2021 | Li |
| D942,061 | S | 1/2022 | Peng |
| D942,228 | S | 2/2022 | Yang |
| D945,041 | S | 3/2022 | Zhang |
| D952,932 | S | 5/2022 | Sun |
| D967,556 | S | 10/2022 | Zhang |
| D977,201 | S | 1/2023 | Zheng |
| D983,859 | S | 4/2023 | Guan |
| D984,751 | S | 4/2023 | Shen |
| 11,627,242 | B2 | 4/2023 | Perkins |
| D987,204 | S | 5/2023 | Yao |
| D987,205 | S | 5/2023 | Liu |
| D988,569 | S | 6/2023 | Wang |
| D1,000,005 | S | 9/2023 | Kang |
| D1,006,277 | S | 11/2023 | Lin |
| D1,013,972 | S | 2/2024 | Lin |
| D1,017,913 | S | 3/2024 | Guo |
| D1,019,008 | S | 3/2024 | Li |
| D1,019,875 | S | 3/2024 | Mo |
| D1,021,764 | S | 4/2024 | Zhao |
| D1,026,347 | S | 5/2024 | Liao |
| D1,026,348 | S | 5/2024 | Li |
| 11,985,957 | B1 | 5/2024 | Li |
| D1,032,959 | S | 6/2024 | Yuan |
| D1,049,507 | S | 10/2024 | Li |
| 2002/0078897 | A1 | 6/2002 | Garcia-Lucio |
| 2003/0026461 | A1 | 2/2003 | Arthur |
| 2003/0125946 | A1 | 7/2003 | Hsu |
| 2003/0216649 | A1 | 11/2003 | Nowicki |
| 2004/0107104 | A1 | 6/2004 | Schaphorst |
| 2004/0194727 | A1 | 10/2004 | Conway |
| 2004/0216682 | A1 | 11/2004 | Kuelbs |
| 2005/0025357 | A1 | 2/2005 | Landwehr |
| 2005/0049876 | A1 | 3/2005 | Agranat |
| 2006/0065202 | A1 | 3/2006 | Fort, II |
| 2006/0090707 | A1 | 5/2006 | Donegan |
| 2006/0150920 | A1 | 7/2006 | Patton |
| 2007/0028843 | A1 | 2/2007 | Nock |
| 2007/0028847 | A1 | 2/2007 | Colvin |
| 2007/0039554 | A1 | 2/2007 | Colvin |
| 2007/0084412 | A1 | 4/2007 | Eager |
| 2007/0221133 | A1 | 9/2007 | Richmond |
| 2007/0241863 | A1 | 10/2007 | Udagawa |
| 2007/0295277 | A1 | 12/2007 | Kin |
| 2008/0035068 | A1 | 2/2008 | Gou |
| 2008/0087225 | A1 | 4/2008 | Lin |
| 2008/0251025 | A1 | 10/2008 | Guay |
| 2008/0264239 | A1 | 10/2008 | Lemons |
| 2009/0031962 | A1 | 2/2009 | Webber |
| 2009/0067676 | A1 | 3/2009 | Kempf |
| 2009/0133636 | A1 | 5/2009 | Richmond |
| 2009/0255475 | A1 | 10/2009 | Black |
| 2009/0255476 | A1 | 10/2009 | Colvin |
| 2009/0308321 | A1 | 12/2009 | Szczygiel-durante |

(56) References Cited

U.S. PATENT DOCUMENTS

| | | | |
|---|---|---|---|
| 2009/0320765 A1 | 12/2009 | Gauker | |
| 2010/0192866 A1 | 8/2010 | Mcmullen | |
| 2010/0242848 A1 | 9/2010 | Vaughn, Jr. | |
| 2011/0066952 A1 | 3/2011 | Kinch | |
| 2011/0082574 A1 | 4/2011 | Pachet | |
| 2011/0139076 A1 | 6/2011 | Pu | |
| 2011/0297093 A1 | 12/2011 | Lai | |
| 2011/0297095 A1 | 12/2011 | Cruz | |
| 2012/0060762 A1 | 3/2012 | Cowger | |
| 2012/0073505 A1 | 3/2012 | Cote | |
| 2013/0036978 A1 | 2/2013 | Morris | |
| 2013/0128566 A1 | 5/2013 | Cravedi | |
| 2013/0155235 A1 | 6/2013 | Clough | |
| 2013/0222581 A1 | 8/2013 | Wydner | |
| 2013/0266147 A1 | 10/2013 | Berres | |
| 2013/0275894 A1 | 10/2013 | Bell | |
| 2013/0282379 A1 | 10/2013 | Stephenson | |
| 2013/0284103 A1 | 10/2013 | Colvin | |
| 2014/0109835 A1 | 4/2014 | Colvin | |
| 2014/0109836 A1 | 4/2014 | Gauker | |
| 2014/0123907 A1 | 5/2014 | James | |
| 2014/0158056 A1 | 6/2014 | Vaughn, Jr. | |
| 2014/0182518 A1 | 7/2014 | Boehm | |
| 2014/0360435 A1 | 12/2014 | Cote | |
| 2015/0020742 A1 | 1/2015 | Faunce | |
| 2015/0062333 A1 | 3/2015 | Kilner | |
| 2015/0122186 A1 | 5/2015 | Donegan | |
| 2015/0136032 A1 | 5/2015 | Cote | |
| 2015/0216145 A1 | 8/2015 | Nelson | |
| 2015/0373945 A1 | 12/2015 | Sung | |
| 2016/0007574 A1 | 1/2016 | Lipford | |
| 2016/0128308 A1 | 5/2016 | Lipford | |
| 2016/0132750 A1 | 5/2016 | Yang et al. | |
| 2016/0156989 A1* | 6/2016 | Lovett | H04N 21/61 |
| 2016/0366319 A1 | 12/2016 | Perkins | |
| 2016/0374318 A1 | 12/2016 | Colvin | |
| 2017/0059710 A1 | 3/2017 | Delfs | |
| 2017/0164585 A1 | 6/2017 | Cote | |
| 2017/0186175 A1 | 6/2017 | Kumeno | |
| 2017/0195551 A1 | 7/2017 | Klein | |
| 2017/0258073 A1 | 9/2017 | Lynders | |
| 2018/0116170 A1 | 5/2018 | Joshi | |
| 2018/0228132 A1 | 8/2018 | Henehan | |
| 2018/0349720 A1 | 12/2018 | Mitchell | |
| 2019/0075761 A1 | 3/2019 | Creed | |
| 2019/0098875 A1 | 4/2019 | Mcferrin | |
| 2019/0110444 A1 | 4/2019 | Boehm | |
| 2019/0274287 A1 | 9/2019 | Combs | |
| 2019/0320620 A1 | 10/2019 | Lubic | |
| 2019/0320621 A1 | 10/2019 | Lubic | |
| 2019/0320622 A1 | 10/2019 | Haney | |
| 2020/0027026 A1 | 1/2020 | Cook | |
| 2020/0196577 A1 | 6/2020 | Haney | |
| 2020/0253166 A1 | 8/2020 | Cote | |
| 2020/0396961 A1 | 12/2020 | Zetouna | |
| 2021/0137097 A1 | 5/2021 | Henskes | |
| 2021/0165085 A1 | 6/2021 | Downing et al. | |
| 2021/0176982 A1 | 6/2021 | Kleckner | |
| 2021/0204526 A1 | 7/2021 | Jenkins | |
| 2022/0132810 A1 | 5/2022 | Levite | |
| 2023/0027590 A1* | 1/2023 | Hu | A01K 39/012 |
| 2023/0146594 A1 | 5/2023 | Tian | |
| 2023/0148570 A1* | 5/2023 | Pekcan | A01K 31/14 |
| 2023/0189764 A1 | 6/2023 | Shen | |
| 2025/0029412 A1 | 1/2025 | Bankiti et al. | |

FOREIGN PATENT DOCUMENTS

| | | | |
|---|---|---|---|
| CA | 223052 | A | 8/2024 |
| CA | 223053 | A | 8/2024 |
| CA | 223050 | | 9/2024 |
| CN | 201787780 | U | 4/2011 |
| CN | 103493752 | A | 1/2014 |
| CN | 203860204 | U | 10/2014 |
| CN | 303084572 | | 1/2015 |
| CN | 204206889 | U | 3/2015 |
| CN | 209950114 | U | 1/2020 |
| CN | 113115727 | | 7/2021 |
| CN | 306683052 | S | 7/2021 |
| CN | 306734087 | S | 8/2021 |
| CN | 306881720 | S | 10/2021 |
| CN | 307502507 | | 8/2022 |
| CN | 308016637 | | 5/2023 |
| CN | 308098208 | | 6/2023 |
| CN | 308126373 | | 7/2023 |
| CN | 116740646 | A | 9/2023 |
| CN | 308427256 | | 1/2024 |
| CN | 308436803 | | 1/2024 |
| CN | 308562376 | | 4/2024 |
| CN | 308579611 | | 4/2024 |
| CN | 308588701 | | 4/2024 |
| CN | 308915972 | | 10/2024 |
| CN | 308948280 | | 11/2024 |
| EM | 015059722 | | 5/2024 |
| EP | 1248465 | A1 | 10/2002 |
| EP | 3721706 | A1 | 10/2020 |
| GB | 3016048 | | 2/2004 |
| GB | 6070406 | | 9/2019 |
| GB | 2616081 | A | 8/2023 |
| KR | 20130012147 | A | 2/2013 |
| KR | 20210101030 | A | 8/2021 |
| TW | 200802155 | A | 1/2008 |
| WO | 02077898 | A2 | 10/2002 |
| WO | 2013022926 | A2 | 2/2013 |
| WO | 2014013277 | A2 | 1/2014 |
| WO | 2016176887 | A1 | 11/2016 |
| WO | 2016208066 | A1 | 12/2016 |
| WO | 2020037377 | A1 | 2/2020 |
| WO | 2021198681 | A1 | 10/2021 |
| WO | 2022077113 | A1 | 4/2022 |
| WO | D230308-001 | | 7/2023 |
| WO | D230308-002 | | 7/2023 |
| WO | D230308-003 | | 7/2023 |
| WO | D230308-005 | | 7/2023 |
| WO | D230308-006 | | 7/2023 |
| WO | D230308-007 | | 7/2023 |
| WO | D230308-008 | | 7/2023 |

OTHER PUBLICATIONS

"Meet the friends you never knew you had!", https://web.archive.org/web/20210201122204/https://mybirdbuddy.com/ Retrieved May 10, 2023, 4 pages.

European search report mailed Jun. 4, 2024, issued in corresponding European Patent Application No. 24150471.1, 4 pages.

Communication pursuant to Art. 94(3) EPC mailed Jun. 14, 2024, issued in corresponding European Patent Application No. 24150471.1 , 4 pages.

3.European search report mailed Apr. 11, 2024, issued in corresponding European Patent Application No. 24150472.9, 5 pages.

4. Communication pursuant to Art. 94(3) EPC mailed Apr. 23, 2024, issued in corresponding European Patent Application No. 24150472.9, 6 pages.

Alcantarilla et al., "KAZE Features", ECCV, Part VI, LNCS 7577, pp. 214-227, Year 2012.

Arrastia et al., "Deeply Supervised UNet for Semantic Segmentation to Assist Dermatopathological Assessment of Basal Cell Carcinoma", https://www.mdpi.com'journal;jimaging, 15 pages, Year 2021.

Bay et al., "SURF: Speeded Up Robust Features", ECCV Part I, LNCS 3951, pp. 404-417, Year 2006.

Benjamin Zaitlen (Jun. 21, 2011). Image Capturing Bird Feeder https://www.instructables.com/Image-Capturing-Bird-Feeder/.

Bilantan BirdHi Mag-Bird Feeder with Camera Solar Powered, posted Apr. 2, 2024 [online], [retrieved Oct. 10, 2024. Retrieved from internet, https://www.amazon.sa/-/en/Bird-Feeder-Camera-Smart-Anti-Squirrel/dp/B0CX1GSF3H (Year: 2024).

Bird Buddy A Smart Bird Feeder by Bird Buddy Kickstarter, https://web.archive.org/web/20210209043209/https://www.kickstarter.com/projects/mybirdbuddy, retrieved Jan. 24, 2023, 4 pages.

(56) References Cited

OTHER PUBLICATIONS

Bird Buddy A Smart Bird Feeder Kickstarter, https://web.archive.org/web/20210115073444/https://www.kickstarter.com, retrieved Jan. 24, 2023, 4 pages.
Bird Buddy introduces an AI-powered Smart Hummingbird Feeder and Bird Bath _ TechCrunch, posted May 16, 2023 [online], [retrieved Nov. 20, 2024]. Retrieved from internet, https://techcrunch.com/2023/05/16/birdwatching-tech-startup-bird-buddy-introduces-an-ai-powered-smart-hummingbird-feeder-and-bird-bath/ (Year: 2023).
Bird Buddy Review Smart Bird Feeder & Camera, posted Apr. 30, 2024 [online], [retrieved Oct. 10, 2024]. Retrieved from internet, https://ww.safesmartliving.com/bird-buddy-reviews/ (Year: 2024).
Bird Buddy Smart Bird Feeder review Smart Fun and borderline addictive, posted Apr. 11, 2024 [online], [retrieved Oct. 10, 2024]. Retrieved from internet, https://www.cnn.com/cnn-underscored/reviews/bird-buddy-smar-bird-feeder (Year: 2024).
Bird Buddy Smart Hummingbird Feeder Wayback Machine, posted Jun. 2, 2024 [online], [retrieved Nov. 20, 2024]. Retrieved from internet, https://web.archive.org/web/20240602164554/https://mybirdbuddy.com/product/smart-hummingbird-feeder/ (Year: 2024).
Bird Buddy® Original 3-in-1 Nutrition Set, posted Feb. 12, 2024 [online], [retrieved Nov. 4, 2024]. Retrieved from internet, https://tinyurl.com/4a9xpuuv (Year: 2024).
Bird Buddy® Original 3-in-1 Nutrition Set, posted Feb. 23, 2024 [online], [retrieved Oct. 10, 2024.] Retrieved from internet, http://www.amazon.ca/Bird-Buddy®-Original-Nutrition-Foundation/dp/BOCVHCX1DP (Year: 2024).
Bird Buddy® Original Perch Extender, posted Sep. 15, 2023 [online], [retrieved Sep. 27, 2024], Retrieved from internet, https://tinyurl.com/mr8fr46b (Year: 2023).
Bird Buddy® Smart Hummingbird Feeder with Camera, posted Nov. 3, 2024 [online], [retrieved Nov. 20, 2024]. Retrieved from internet, https://www.amazon.sa/-/en/BUDDY%C2%AE-Smart-Hummingbird-Feeder-Camera/dp/B0DKC39YCJ/ref=sr_1_8?crid=3EVUSXUZPKH51&dib=eyJ2ljoiMSJ9.%E2%80%A6 (Year: 2024).
Bird Photo Booth. Bryson C. Lovett (Oct. 22, 2012). YouTube video: https://www.youtube.com/watch?v=PA1TnYSAlo8 (Oct. 22, 2012).
Birding automation in backyard, https://www.reddit.com/r/BuyltForLife/comments/p2aalp/birding_automation_in_backyard/h8iqncg/?context=3, comment written by Shelmen-wilde date Jun. 2021, retrieved Jun. 8, 2023.
Birdkiss Hummingbird Feeder, posted Jun. 8, 2024[online], [retrieved Aug. 2, 2024]. Retrieved from internet, https://www.amazon.com/Birdkiss-Hummingbird-Close-Up-Watching-Outdoors/dp/B0CSX9FBR1/ref=cm_cr_arp_d_product_top?ie=UTF8&th=1 (Year: 2024).
Birdkiss Smart Hummingbird Feeder with Camera, posted Feb. 1, 2024 [online], [retrieved Aug. 16, 2024]. Retrieved from internet, https://tinyurl.com/mtwuyc6b (Year: 2024).
Cristian R. Palma, "The Use of Tarsal Scale Patterns to Identify Individual Birds of Prey", 125 pages, Jan. 1996.
Erik H. Stauber, "Footprinting of Raptors for Identification", Raptor Research, vol. 18, No. 2, pp. 67-71.
Etnobird Smart Bird Feeder. Smart Nature LLC (Mar. 30, 2015). https://www.etnobird.com/#feeder_about.
Ferreira Andrew C. et al., "Deep learning-based methods for individual recognition in small birds", Methods in Ecology and Evolution, vol. 11, No. 9, Sep. 26, 2020, Retrieved from the https://besjournals.onlinelibrary.wiley.com/doi/10.1111/2041-210X.13436, pp. 1072-1085.
Ferreira et al., "Deep learning-based methods for individual recognition in small birds", http://nbn-resolfing.de/urn:nbn:de:bsz:352-2-2fpdk03125c7i7, 33 pages.
George A. Clark, Jr., "Passerine Foot-Scutes", vol. 89, pp. 549-558, Jul. 1972.
Glass Jar Chick Waterer, posted Dec. 9, 2013 [online], [retrieved Nov. 4, 2024]. Retrieved from internet, https://tinyurl.com/2v6xyvyc (Year: 2013).
Hadji Oussama, "Region of Interest and Redundancy Problem in Migratory Birds Wild Life Surveillance", 2022 International Conference on Advanced Aspects of Software Engineering, Sep. 17, 2022 pp. 1-8.
https://www.amazon.com/Detective-Capture-Close-ups-Recognize-Species/dp/B09J2KS5C3/ref=sr_1_1?crid=3M9FBTUY0Z9CV&keywords=palprot&qid=1640091565&sprefix=palprot%2Caps%2C170&sr=8-1, retrieved Jun. 2023, 5 pages.
Hummingbird Feeder Hanging Hummingbird Waterer, posted Sep. 26, 2019 [online], [retrieved Aug. 16, 2024]. Retrieved from internet, https://tinyurl.com/434crhfv (Year: 2019).
Hummingbird Feeder with Camera, posted Apr. 27, 2024 [online], [retrieved Aug. 2, 2024]. Retrieved from internet, https://tinyurl.com/57bbe5sb (Year: 2024).
Hummingbird-Feeder Ring Hummingbird Feeders for Outdoors, posted Jun. 17, 2021 [online], [retrieved Aug. 29, 2024]. Retrieved from internet, https://www.amazon.ca/Hummingbird-Feeders-Outdoors-Backyard-Decorative/dp/B094VJD6C6 (Year: 2021).
Hummingbird-Feeding-Hummingbirds-Handheld, posted Jan. 19, 2023 [online], retrieved Aug. 29, 2024, Retrieved from internet, https://tinyurl.com/2s4h75df (Year: 2023).
Hummingbird-Replacement-Flowers-Feeding-Outdoor, posted May 21, 2024 [online], [retrieved Aug. 29, 2024]. Retrieved from internet, https://tinyurl.com/293ymuh3 (Year: 2024).
Jeapka Smart Bird Feeder with Camera Solar Powered, posted Apr. 16, 2024 [online], [retrieved Oct. 10, 2024]. Retrieved from internet, https://tinyurl.com/5n7fna3p (Year: 2024).
Kimalab Perch Suet Ball Holder & Mounting Screws Bundle for Bird Buddy, posted Mar. 27, 2024 [online], [retrieved Sep. 27, 2024]. Retrieved from internet https://tinyurl.com/ycyu3862 (Year: 2024).
Kingsyard Recycled Plastic Suet Bird Feeder, posted Aug. 10, 2022 [online], [retrieved Oct. 10, 2024]. Retrieved from internet, https://tinyurl.com/bdd4nhy7 (Year: 2022).
Leutenegger et al., "Binary Robust Invariant Scalable Keypoints", 9 pages, Year 2011.
UK Search and Examination Report for GB2203726.1, Sep. 12, 2022, 7 pages.
UK Search and Examination Report for GB 2203727.9, Sep. 12, 2022, 5 pages.
UK Search and Examination Report for GB 2203729.5, Sep. 12, 2022, 7 pages.
mybirdbuddy.com, posted Jun. 2, 2024 [online], [retrieved Nov. 20, 2024]. Retrieved from internet, https://mybirdbuddy.com/product/smart-hummingbird-feeder/ (Year: 2024).
Name Search Report, 29 pages, Jan. 7, 2022.
Netvue Birdfy Pro Perch, posted Nov. 10, 2022 [online], [retrieved Sep. 27, 2024], Retrieved from internet, https://tinyurl.com/2jsvbv2y (Year: 2022).
North States Mypet Heavy-Duty Suet Birdfeeder, posted Aug. 8, 2012 [online], [retrieved Oct. 10, 2024]. Retrieved from internet, https://tinyurl.com/bdzf59j9 (Year: 2012).
Outdoor Table Lamp Solar Lantern, posted Sep. 29, 2022 [online], [retrieved Oct. 10, 2024]. Retrieved from internet, https://www.amazon.com/Waterproof-Rechargeable-Brightness-Portable-NightLight/dp/B0BGS966PT?th=1 (Year: 2022).
Palprot, Back Nature, The Collision of Thought, https://web.archive.org/web/20210624182210/https://www.palprot.com, retrieved Jan. 24, 2023 8 pages.
Paparazzi Bird Feeder. Ted Pudlik, Aaron Mead and Andrew Roberson (Apr. 2014). https://www.tpudil.com/projects/birdfeeder/.
Pengchuangda (Shenzhen) Industrial Co Ltd, unknown, EU0086477390001, unknown, 3 pages, Aug. 16, 2021, EM.
Pengchuangda (Shenzhen) Industry Co., Ltd, United Kingdom design No. 6154502, registered date Aug. 13, 2021, retrieved from https://www.gov.uk/search-registered-design. (10 pages).
Pet Bird Drinker Feeder, posted Jul. 1, 2024 [online], [retrieved Nov. 4, 2024]. Retrieved from internet, https://www.amazon.com/Drinker-Supplies-Chicken-Automatic-Accessoried/dp/B0D8JNN8BC?th=1 (Year: 2024).
Pictures from Amazon webpages for Bird Detective product, https://www.amazon.com/Detective-Capture-Close-ups-Recognize-Species/

(56) References Cited

OTHER PUBLICATIONS dp/B09J2KS5C3/ref=sr_1_1?crid=3M9FBTUY0Z9CV&keywords=palprot&qid=1640091565&sprefix=palprot%2Caps%2C170&sr=8-1, retrieved Jun. 2023, 6 pages.
Ronneberger et al., "U-Net: Convolutional Networks for Biomedical Image Segmentation", 8 pages, May 18, 2015.
Rublee et al., "ORB an efficient alternative to SIFT or SURF", IEEE International Conference on Computer Vision, Nov. 2011.
Screenshot 1 showing "Bird Buddy, Meet the friends you never knew you had!", retrieved from https://web.archive.org/web/20210201122204/https:/mybirdbuddy.com dated Feb. 1, 2021, on Oct. 11, 2023. (1 page).
Screenshot 10 showing "Can you collect all of them!, Build the ultimate collection", retrieved from https://web.archive.org/web/20210201122204/https:/mybirdbuddy.com dated Feb. 1, 2021, on Oct. 11, 2023. (1 page).
Screenshot 2 showing "Never miss out the birds in your backyard!, Arrival notifications", retrieved from https://web.archive.org/web/20210201122204/https:/mybirdbuddy.com dated Feb. 1, 2021, on Oct. 11, 2023. (1 page).
Screenshot 3 showing "Capture unique close-ups of birds in their moment!, Close up shots full of character", retrieved from https://web.archive.org/web/20210201122204/https:/mybirdbuddy.com dated Feb. 1, 2021, on Oct. 11, 2023. (1 page).
Screenshot 4 showing "Can you collect all of them!, Reliable recognition of bird species", retrieved from https://web.archive.org/web/20210201122204/https:/mybirdbuddy.com dated Feb. 1, 2021, on Oct. 11, 2023. (1 page).
Screenshot 5 showing "With Bird Buddy, you can be proud of yourself for more than just your amazing snapshot collection.", retrieved from https://web.archive.org/web/20210201122204/https:/mybirdbuddy.com dated Feb. 1, 2021, on Oct. 11, 2023. (1 page).
Screenshot 6 showing "Never miss out the birds in your backyard!, Control the camera with your phone", retrieved from https://web.archive.org/web/20210201122204/https:/mybirdbuddy.com dated Feb. 1, 2021, on Oct. 11, 2023. (1 page).
Screenshot 7 showing "Never miss out the birds in your backyard!, History of your bird visitors", retrieved from https://web.archive.org/web/20210201122204/https:/mybirdbuddy.com dated Feb. 1, 2021, on Oct. 11, 2023. (1 page).
Screenshot 8 showing "Capture unique close-ups of birds in their moment!, Goofy, selfie-like perspective", retrieved from https://web.archive.org/web/20210201122204/https:/mybirdbuddy.com dated Feb. 1, 2021, on Oct. 11, 2023. (1 page).
Screenshot 9 showing "Can you collect all of them!, Hints for attracting new species to Bird Buddy", retrieved from https://web.archive.org/web/20210201122204/https:/mybirdbuddy.com dated Feb. 1, 2021, on Oct. 11, 2023. (1 page).
Smart Hummingbird Feeder with Camera, posted Feb. 3, 2024 [online], [retrieved Nov. 20, 2024]. Retrieved from internet, https://tinyurl.com/yp44td8f (Year: 2024).
SOLIOM Humbirdy, posted Aug. 27, 2024 [online], [retrieved Nov. 20, 2024]. Retrieved from internet, https://tinyurl.com/y64njkde (Year: 2024).
Stmicroelectronics, VL6180 Proximity Sensing Module Datasheet, Jul. 2021, 74 pages.
Subject Matter Search Report, 22 pages, Jun. 24, 2021.
Sullivan Fintan O et al., "Feature-based Image Matching for Identifying Individual Kaka", Retrieved on Mar. 26, 2024 https://arxiv.org/pdf/2301.06678.pdf, Jan. 24, 2023.
Supa Hanging Water Drinker For Wild Birds, posted Feb. 3, 2017 [online], [retrieved Nov. 4, 2024]. Retrieved from internet, https://tinyurl.com/399s4vvt (Year: 2017).
The best smart bird feeders of 2024, posted Jan. 4, 2023 [online], retrieved Aug. 2, 2024]. Retrieved from internet, https://www.zdnet.com/home-and-office/yard-outdoors/best-smart-bird-feeders/ (Year: 2023).
Tweeting Bird Feeder. Mark Reimer (Aug. 3, 2014). https://www.instructables.com/Tweeting-Bird-Feeder/.
Upgraded Second Generation Smart Humming Bird Feeder, posted Aug. 30, 2023 [online], retrieved Aug. 16, 2024. Retrieved from internet, https://tinyurl.com/bdcuhb6a (Year: 2023).
Wireless Bird Feeder Webcam. "Fleanine" (Mar. 29, 2007). https://www.instructables.com/Wireless-Bird-Feeder-Webcam/.
WUIPET Bird Feeder with Camera with AI, posted Mar. 18, 2024 [online], [retrieved Oct. 10, 2024], Retrieved from internet, https://tinyurl.com/55aamve6 (Year: 2024).
Zechuang Zheng, European Design No. 008480586-0001, dated Mar. 30, 2021, retrieved from https://www.tmdn.org/tmdsview-web/#/dsview/detail/EM700000008480586-0001, exported on Dec. 13, 2023. (10 pages).
Zechuang Zheng, United Kingdom design No. 6127678, registered date Mar. 31, 2021, retrieved from https://www.gov.uk/search-registered-design. (9 pages).
ZUMMR-Hummingbird-Ring-Feeder-Red, posted Jan. 24, 2018 [online], [retrieved Aug. 29, 2024]. Retrieved from internet, https://tinyurl.com/yjrkztkz (Year: 2018).
Search Report for GB Application No. 2314043.7 dated Mar. 13, 2024.

* cited by examiner

BIRD STATION

TECHNICAL FIELD

Example aspects herein generally relate to the field of bird stations.

BACKGROUND

Various approaches have been taken to monitor birds. Birdwatchers and ornithologists observe birds using the naked eye or binoculars, cameras and the like. Information about birds may be gathered for scientific or leisure purposes. For example, species of birds visiting a particular location may be monitored to record migration patterns and distribution of birds in a particular location. However, this approach to monitoring birds requires the birdwatcher or ornithologist to be physically present.

In addition to monitoring animals, birdwatchers and ornithologists are experts in identifying birds. Having an in-depth knowledge of birds is required to identify many species of birds.

SUMMARY

There is provided, in accordance with a first example aspect herein, a bird station comprising a perching area and a detachable electronic control module, the detachable electronic control module comprising at least one of a camera unit and a microphone unit; a controller; and an object detection unit comprising a vertical cavity surface emitting laser (VCSEL), wherein the VCSEL is operable to generate a source beam directed towards the perching area of the bird station, the object detection unit is arranged to detect a return beam formed by reflection of the source beam from an object when the object is located in the perching area of the bird station and, based on a detection of the return beam, determine that there is an object located in the perching area, and the controller is operable to activate the at least one of the camera unit and the microphone unit in response to the object detection unit determining that there is an object located in the perching area of the bird station.

The electronic control module may further comprise a Hall Effect sensor operable to detect a detachment of the electronic control module from the bird station, wherein the controller is further operable to de-activate the object detection unit in response to the Hall Effect sensor detecting the detachment.

The Hall Effect sensor may be further operable to detect attachment of the electronic control module to the bird station, and the controller may be further operable to activate the object detection unit in response to the Hall Effect sensor detecting attachment of the electronic control module to the bird station.

The bird station may further comprise a bird feed receptacle, and the electronic control module may further comprise a feed sensor arrangement operable to detect a level of bird feed in the bird feed receptacle.

The feed sensor arrangement may be further arranged to detect whether the level of bird feed is below a threshold level, and the controller may be further operable to output a low feed signal in response to the feed sensor arrangement detecting that the level of bird feed is below the threshold level.

The feed sensor arrangement may comprise one or more capacitive sensors operable to detect a moisture content of the bird feed indicative of a presence of bird feed proximate the one or more capacitive sensors.

The feed sensor arrangement may comprise one or more luminosity sensors operable to detect a luminosity level in the bird feed receptacle to determine a presence of bird feed proximate the one or more luminosity sensors.

The electronic control unit may further comprise a wireless communication module configured to send a notification to a remote computing device via a wireless network in response to the object detection unit determining that there is an object located in the perching area of the bird station.

The object detection unit may be arranged to determine that there is an object located in the perching area by processing the detection of the return beam to determine a distance of the object from the object detection unit; comparing the distance of the object to a threshold distance; and determining that there is an object located in the perching area of the bird station when the determined distance of the object from the object detection unit is within the threshold distance.

The bird station may be at least one of a bird feeder, a bird bath or a bird nesting box.

There is provided, in accordance with a second example aspect herein, an electronic control module for a bird station comprising at least one of a camera unit and a microphone unit; a controller; and an object detection unit comprising a vertical cavity surface emitting laser (VCSEL), wherein the VCSEL is operable to generate a source beam directed towards the perching area of the bird station, the object detection unit is arranged to detect a return beam formed by reflection of the source beam from an object when the object is located in the perching area of the bird station and, based on a detection of the return beam, determine that there is an object located in the perching area; and the controller is operable to activate the at least one of the camera unit and the microphone unit in response to the object detection unit determining that there is an object located in the perching area of the bird station.

The electronic control may further comprise a Hall Effect sensor operable to detect a detachment of the electronic control module from the bird station, wherein the controller may be further operable to de-activate the object detection unit in response to the Hall Effect sensor detecting the detachment.

The Hall Effect sensor may be further operable to detect attachment of the electronic control module to the bird station, and the controller may be further operable to activate the object detection unit in response to the Hall Effect sensor detecting attachment of the electronic control module to the bird station.

The electronic control module may further comprise a feed sensor arrangement operable to detect a level of bird feed in a bird feed receptacle of the bird station, when the electronic control module is attached to the bird station.

The feed sensor arrangement may be further operable to detect that the level of bird feed is below a threshold level, wherein the controller may be further operable to output a low feed signal in response to the feed sensor arrangement detecting that the level of bird feed is below the threshold level.

The feed sensor arrangement may comprise one or more capacitive sensors operable to detect a moisture content of the bird feed indicative of a presence of bird feed proximate the one or more capacitive sensors.

The feed sensor arrangement may comprise one or more luminosity sensors operable to detect a luminosity level in the bird feed receptacle to determine a presence of bird feed proximate the one or more luminosity sensors.

The electronic control module may further comprise a wireless communication module configured to send a notification to a remote computing device via a wireless network in response to the object detection unit determining that there is an object located in the perching area of the bird station.

The object detection unit may be arranged to determine that there is an object located in the perching area by processing the detection of the return beam to determine a distance of the object from the object detection unit; comparing the distance of the object to a threshold distance; and determining that there is an object located in the perching area of the bird station when the determined distance of the object from the object detection unit is within the threshold distance.

There is provided, in accordance with a third example aspect herein, a system comprising a bird station and the electronic control module of the second example aspect.

There is provided, in accordance with a fourth example aspect herein, a bird station comprising a perching area; and a detachable electronic control module comprising a controller; an object detection unit arranged to detect an object located in the perching area; and a Hall Effect sensor operable to detect a detachment of the electronic control module from the bird station, wherein the controller is operable to de-activate the object detection unit in response to the Hall Effect sensor detecting the detachment.

The Hall Effect sensor may be further operable to detect attachment of the electronic control module to the bird station, and the controller may be further operable to activate the object detection unit in response to the Hall Effect sensor detecting attachment of the electronic control module to the bird station.

The electronic control module may further comprise at least one of a camera unit and a microphone unit, wherein the object detection unit may be arranged to generate a source beam directed towards the perching area of the bird station, detect a return beam formed by reflection of the source beam from an object when the object is located in the perching area of the bird station and, based on a detection of the return beam, determine that there is an object located in the perching area, and wherein the controller may be operable to activate the at least one of the camera unit and the microphone unit in response to the object detection unit determining that there is an object located in the perching area of the bird station.

The bird station may further comprise a bird feed receptacle, and the electronic control module may further comprise a feed sensor arrangement operable to detect a level of bird feed in the bird feed receptacle.

The feed sensor arrangement may be further arranged to detect whether the level of bird feed is below a threshold level, and the controller may be further operable to output a low feed signal in response to the feed sensor arrangement detecting that the level of bird feed is below the threshold level.

The feed sensor arrangement may comprise one or more capacitive sensors operable to detect a moisture content of the bird feed indicative of a presence of bird feed proximate the one or more capacitive sensors.

The feed sensor arrangement may comprise one or more luminosity sensors operable to detect a luminosity level in the bird feed receptacle to determine a presence of bird feed proximate the one or more luminosity sensors.

The electronic control unit may further comprise a wireless communication module configured to send a notification to a remote computing device via a wireless network in response to the object detection unit determining that there is an object located in the perching area of the bird station.

The object detection unit may be arranged to determine that there is an object located in the perching area by processing the detection of the return beam to determine a distance of the object from the object detection unit; comparing the distance of the object to a threshold distance; and determining that there is an object located in the perching area of the bird station when the determined distance of the object from the object detection unit is within the threshold distance.

The object detection unit may comprise a vertical cavity surface emitting laser (VCSEL).

The bird station may be at least one of a bird feeder, a bird bath or a bird nesting box.

There is provided, in accordance with a fifth example aspect herein, an electronic control module for a bird station comprising a controller; an object detection unit arranged to detect an object located in a perching area of the bird station; and a Hall Effect sensor operable to detect a detachment of the electronic control module from the bird station, wherein the controller is operable to de-activate the object detection unit in response to the Hall Effect sensor detecting the detachment.

The Hall Effect sensor may be further operable to detect attachment of the electronic control module to the bird station, and the controller may be further operable to activate the object detection unit in response to the Hall Effect sensor detecting attachment of the electronic control module to the bird station.

The electronic control module may further comprise at least one of a camera unit and a microphone unit, wherein the object detection unit may be arranged to generate a source beam directed towards the perching area of the bird station, detect a return beam formed by reflection of the source beam from an object when the object is located in the perching area of the bird station and, based on a detection of the return beam, determine that there is an object located in the perching area, and wherein the controller may be operable to activate the at least one of the camera unit and the microphone unit in response to the object detection unit determining that there is an object located in the perching area of the bird station.

The electronic control module may further comprise a feed sensor arrangement operable to detect a level of bird feed in a bird feed receptacle of the bird station, when the electronic control module is attached to the bird station.

The feed sensor arrangement may be further operable to detect that the level of bird feed is below a threshold level, wherein the controller may be further operable to output a low feed signal in response to the feed sensor arrangement detecting that the level of bird feed is below the threshold level.

The feed sensor arrangement may comprise one or more capacitive sensors operable to detect a moisture content of the bird feed indicative of a presence of bird feed proximate the one or more capacitive sensors.

The feed sensor arrangement may comprise one or more luminosity sensors operable to detect a luminosity level in the bird feed receptacle to determine a presence of bird feed proximate the one or more luminosity sensors.

The electronic control module may further comprise a wireless communication module configured to send a notification to a remote computing device via a wireless network in response to the object detection unit determining that there is an object located in the perching area of the bird station.

The object detection unit may be arranged to determine that there is an object located in the perching area by processing the detection of the return beam to determine a distance of the object from the object detection unit; comparing the distance of the object to a threshold distance; and determining that there is an object located in the perching area of the bird station when the determined distance of the object from the object detection unit is within the threshold distance.

There is provided, in accordance with a sixth example aspect herein, a system comprising a bird station and the electronic control module of the fifth example aspect.

There is provided, in accordance with a seventh example aspect herein, a bird station comprising a perching area; a bird feed receptacle; and a detachable electronic control module comprising a controller; and a feed sensor arrangement operable to detect a level of bird feed in the bird feed receptacle and to detect whether the level of bird feed is below a threshold level, and wherein the controller is operable to generate a low feed signal in response to the feed sensor arrangement detecting that the level of bird feed is below the threshold level.

The feed sensor arrangement may comprise one or more capacitive sensors operable to detect a moisture content of the bird feed indicative of a presence of bird feed proximate the one or more capacitive sensors.

The feed sensor arrangement may comprise one or more luminosity sensors operable to detect a luminosity level in the bird feed receptacle to determine a presence of bird feed proximate the one or more luminosity sensors.

The electronic control module may further comprise at least one of a camera unit and a microphone unit; an object detection unit operable to generate a source beam directed towards the perching area of the bird station, detect a return beam formed by reflection of the source beam from an object when the object is located in the perching area of the bird station and, based on a detection of the return beam, determine that there is an object located in the perching area, and wherein the controller may be operable to activate the at least one of the camera unit and the microphone unit in response to the object detection unit determining that there is an object located in the perching area of the bird station.

The electronic control module may further comprise a Hall Effect sensor operable to detect a detachment of the electronic control module from the bird station, wherein the controller may be further operable to de-activate the object detection unit in response to the Hall Effect sensor detecting the detachment.

The Hall Effect sensor may be further operable to detect attachment of the electronic control module to the bird station, and the controller may be further operable to activate the object detection unit in response to the Hall Effect sensor detecting attachment of the electronic control module to the bird station.

The electronic control unit may further comprise a wireless communication module configured to send a notification to a remote computing device via a wireless network in response to the controller generating a low feed signal.

The object detection unit may be arranged to determine that there is an object located in the perching area by processing the detection of the return beam to determine a distance of the object from the object detection unit; comparing the distance of the object to a threshold distance; and determining that there is an object located in the perching area of the bird station when the determined distance of the object from the object detection unit is within the threshold distance.

The bird station may be at least one of a bird feeder, a bird bath or a bird nesting box.

There is provided, in accordance with an eighth example aspect herein, an electronic control module for a bird station comprising a controller; and a feed sensor arrangement operable to detect a level of bird feed in a bird feed receptacle of the bird station and to detect whether the level of bird feed is below a threshold level, and wherein the controller is operable to generate a low feed signal in response to the feed sensor arrangement detecting that the level of bird feed is below the threshold level.

The feed sensor arrangement may comprise one or more capacitive sensors operable to detect a moisture content of the bird feed indicative of a presence of bird feed proximate the one or more capacitive sensors.

The feed sensor arrangement may comprise one or more luminosity sensors operable to detect a luminosity level in the bird feed receptacle to determine a presence of bird feed proximate the one or more luminosity sensors.

The electronic control module may further comprise at least one of a camera unit and a microphone unit; an object detection unit operable to generate a source beam directed towards the perching area of the bird station, detect a return beam formed by reflection of the source beam from an object when the object is located in the perching area of the bird station and, based on a detection of the return beam, determine that there is an object located in the perching area, and wherein the controller may be operable to activate the at least one of the camera unit and the microphone unit in response to the object detection unit determining that there is an object located in the perching area of the bird station.

The electronic control module may further comprise a Hall Effect sensor operable to detect a detachment of the electronic control module from the bird station, wherein the controller may be further operable to de-activate the object detection unit in response to the Hall Effect sensor detecting the detachment.

The Hall Effect sensor may be further operable to detect attachment of the electronic control module to the bird station, and the controller may be further operable to activate the object detection unit in response to the Hall Effect sensor detecting attachment of the electronic control module to the bird station.

The electronic control module may further comprise a wireless communication module configured to send a notification to a remote computing device via a wireless network in response to the controller generating a low feed signal.

The object detection unit may be arranged to determine that there is an object located in the perching area by processing the detection of the return beam to determine a distance of the object from the object detection unit; comparing the distance of the object to a threshold distance; and determining that there is an object located in the perching area of the bird station when the determined distance of the object from the object detection unit is within the threshold distance.

There is provided, in accordance with a ninth example aspect herein, a system comprising a bird station and the electronic control module of the eighth example aspect.

BRIEF DESCRIPTION OF THE DRAWINGS

Example embodiments will now be explained in detail, by way of non-limiting example only, with reference to the accompanying figures described below. Like reference numerals appearing in different ones of the figures can denote identical or functionally similar elements, unless indicated otherwise.

DETAILED DESCRIPTION OF EXAMPLE EMBODIMENTS

Bird stations in accordance with example embodiments may be provided with one or more amenities that are used to attract birds to the bird station. Example bird stations include bird feeders, bird baths, bird nesting boxes and the like. In the case of a bird feeder, bird feed is provided to attract birds. In the case of a bird bath, water is provided in which birds can bathe. In the case of a nesting box, a place for the bird to nest is provided. As such, birds can be attracted to the bird station, and image and/or audio data of the bird is captured.

The bird station of an example embodiment comprises a detachable electronic control module comprising a camera unit and/or a microphone unit, an object detection unit, and a controller. The object detection unit is provided to detect birds visiting the bird station. The controller is configured to activate the camera unit and/or the microphone unit when a bird is detected by the object detection unit.

Once a bird has been detected at the bird station, the electronic control module may send a notification to a user device. A video feed obtained from the camera unit, and/or an audio feed obtained from the microphone unit, of the bird detected at the bird station may also be provided by the electronic control module to the user device.

Since the object detection unit can be configured to detect objects within a certain range of the object detection unit, the camera and/or the microphone may only be triggered when a bird is within a pre-determined range of the object detection unit, thereby reducing the number of false notifications that are issued, for example from nearby walls, branches, plants etc. Furthermore, since the camera unit and/or microphone unit are activated only when a bird is detected at the bird station, power resources are more efficiently used.

Figure 1A:
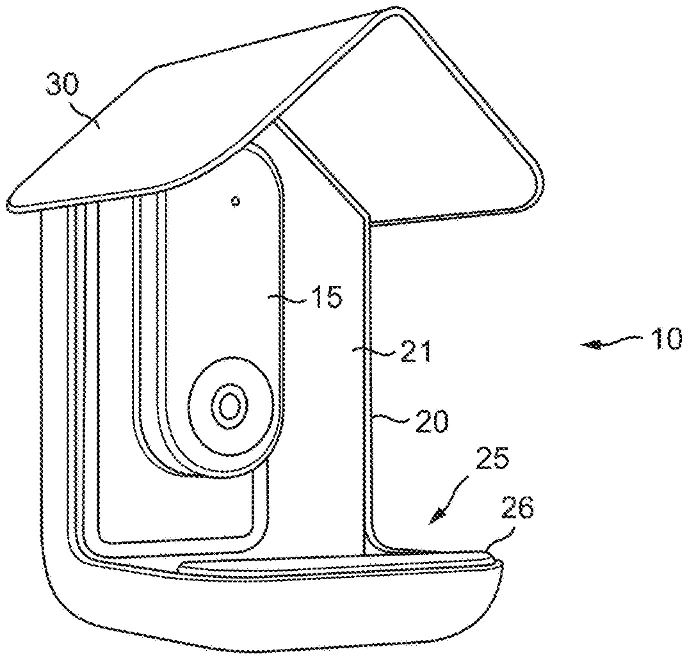
FIG. 1A illustrates a bird station in the form of a bird feeder and an electronic control module attached thereto in accordance with an example embodiment.

FIG. 1A shows a bird station in the form of a bird feeder 10 in accordance with an example embodiment. The bird feeder 10 is shown with a detachable electronic control module 15 attached thereto. The bird feeder 10 comprises a housing 20, a perching area 25 and a roof 30. The roof 30 may be provided with one or more solar panels (not shown) to recharge a battery that provides power to the electronic control module 15 when exposed to daylight. The perching area 25 comprises a perch 26 arranged to allow a bird to perch thereon. As will be explained in more detail below, the perching area 25 is situated in front of the housing 20 so that image data representing images of the bird may be captured by the camera unit and/or audio data representing sounds from the bird may be captured by the microphone unit of the electronic control module 15 when the bird is perching in the perching area 25.

The housing 20 comprises a bird feed receptacle 21. Bird feed stored in the bird feed receptacle 21 falls under gravity into a tray situated in the perching area 25. The bird feed may then be consumed by birds visiting the bird feeder 10.

Figure 1B:
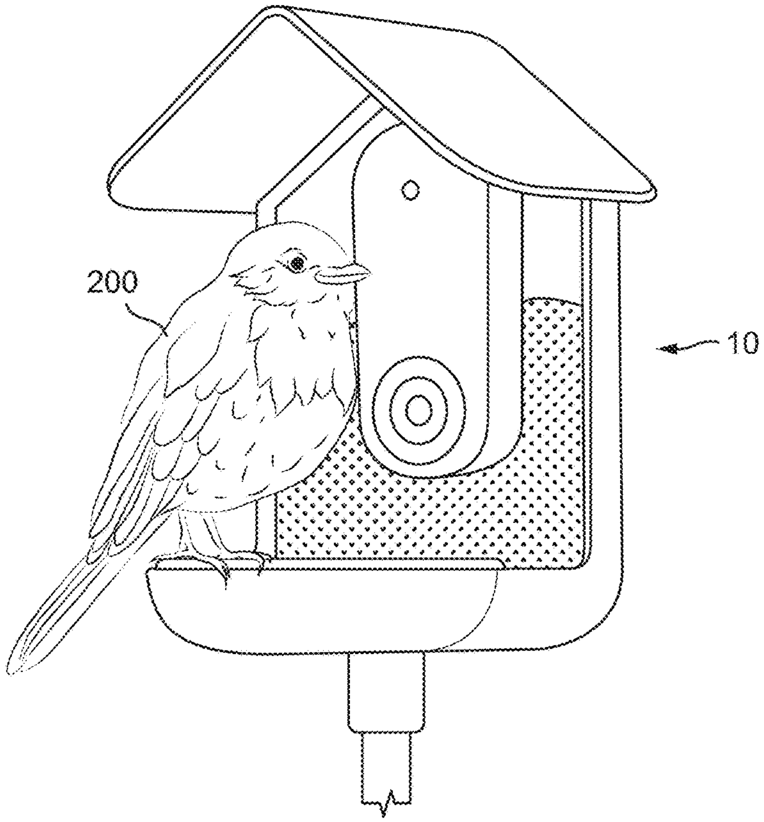
FIG. 1B illustrates a bird feeder and a bird visiting said bird feeder.

FIG. 1B shows the bird feeder 10 and a bird 200 visiting the bird feeder 10. When the bird 200 is detected by an object detection unit of the electronic control module 15, an activation signal is sent to a camera unit and/or a microphone unit. The camera unit of the electronic control module 15 is configured, once activated, to capture image data representing images of the bird 200. The microphone unit is configured, once activated, to capture audio data representing sounds of the bird 200.

Figure 2A:
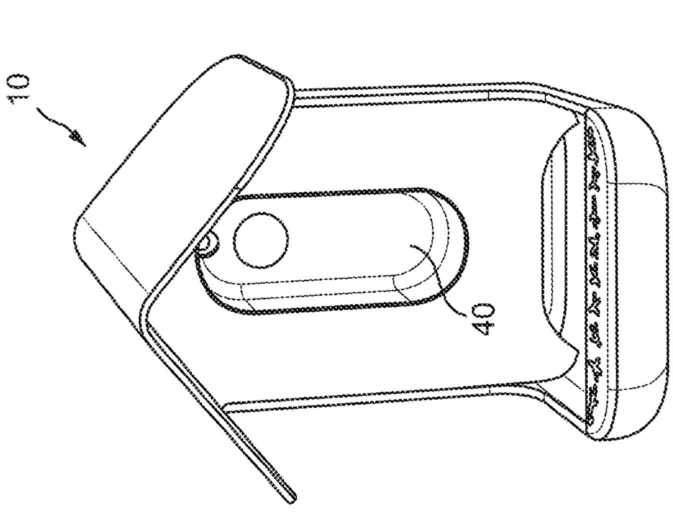
FIG. 2A illustrates a bird feeder with the electronic control module removed therefrom.
Figure 2B:
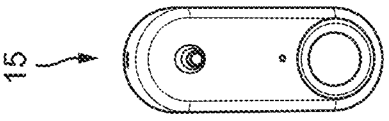
FIG. 2B illustrates the electronic control module when not attached to a bird station.

FIG. 2A illustrates the bird feeder 10 without the electronic control module 15 inserted therein. FIG. 2B illustrates the electronic control module 15 itself.

Figure 2C:
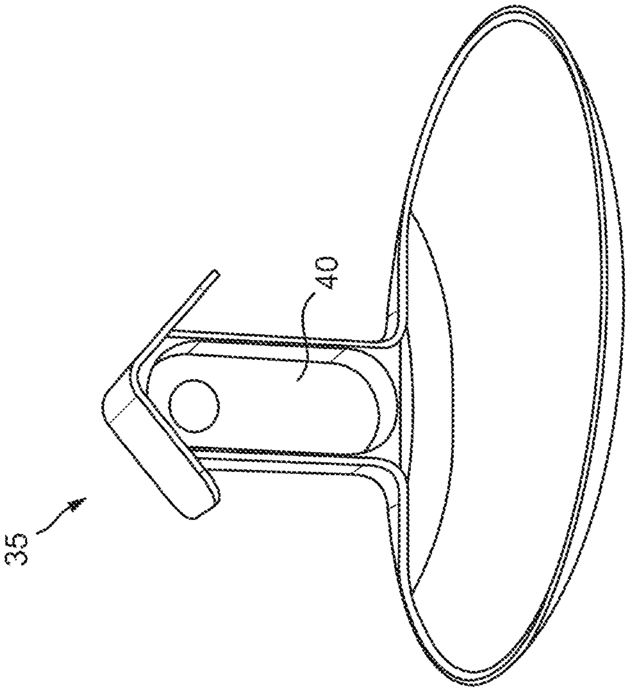
FIG. 2C illustrates a bird station in the form of a bird bath in accordance with an example embodiment.

FIG. 2C illustrates a bird bath 35, which is a further example of a bird station in accordance with another example embodiment.

The bird feeder 10 and the bird bath 35 each comprises a recess 40 to receive and retain the electronic control module 15, the recess 40 being complementary in shape to the electronic control module 15. As such, the electronic control module 15 is compatible with different types of bird station. The recess 40 of the bird feeder 10 and the recess 40 of the bird bath 35 each contain a magnet to assist in holding the electronic control module 15 in place. The magnet further serves to interact with a Hall Effect sensor of the electronic control module 15, as explained in more detail below.

Figure 3:
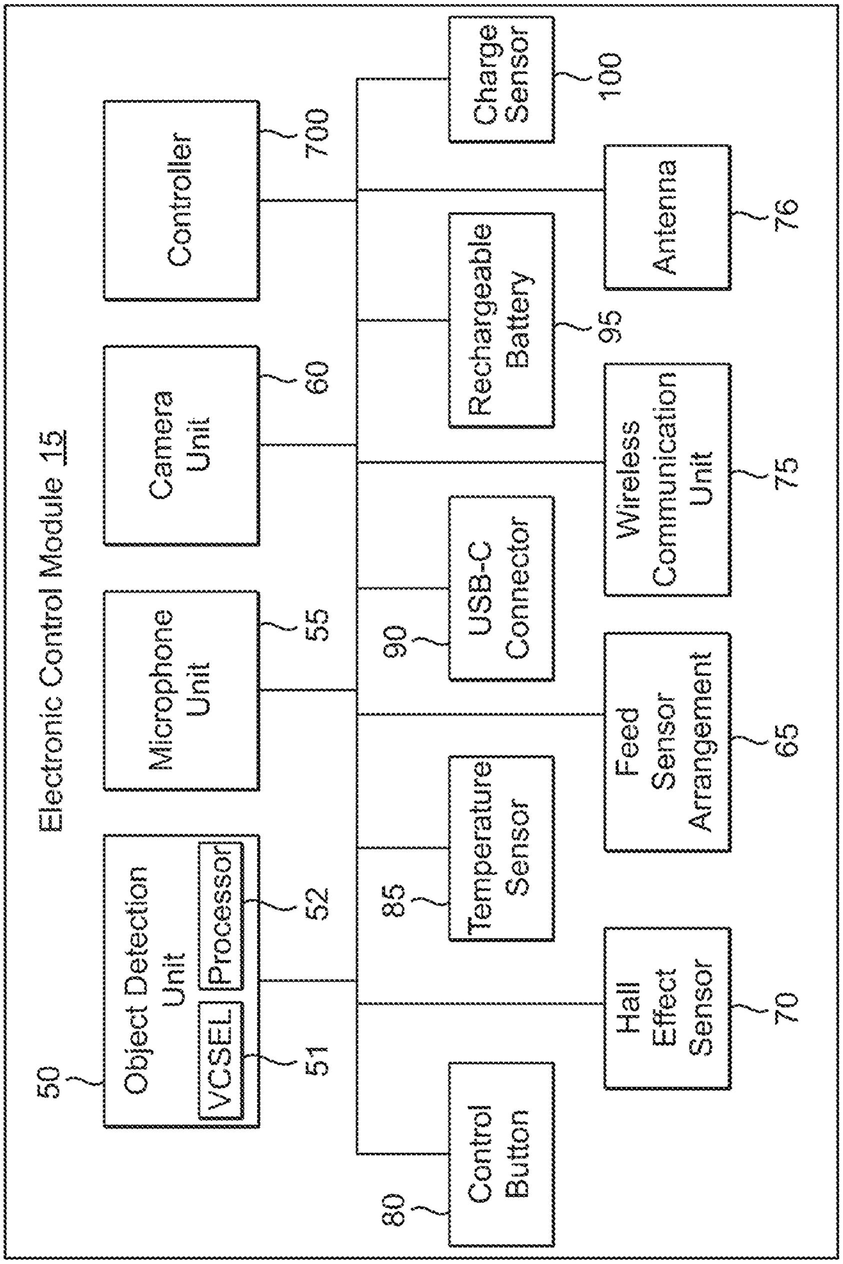
FIG. 3 is a schematic block diagram illustrating components of the electronic control module.

FIG. 3 illustrates schematically components of the electronic control module 15 in accordance with an example embodiment.

The electronic control module 15 comprises an object detection unit 50 comprising a vertical cavity surface emitting laser (VCSEL) 51. The electronic control unit 15 further comprises a microphone unit 55 to capture audio data and a camera unit 60 to capture image data. The electronic control unit 15 further comprises a controller 700 to send and/or receive information (including control instructions and/or data) with the other illustrated components of the electronic control module 15, for example control signals for activating and de-activating one or more of the components in response to particular condition(s) being satisfied.

The object detection unit 50 is configured to detect an object in the perching area 25 of the bird feeder 10. In response to detecting an object in the perching area 25, the object detection unit 50 may output an activation signal to the controller 700. The controller 700 may activate the camera unit 60 and/or the microphone unit 55 in response to receiving the activation signal from the object detection unit 50.

The inventors initially tried conventional object sensors as the object detection unit 50, such as a UV sensor, IR sensor and PIR sensor, but all of these were found to produce false alarms caused, for example, by remote objects and sunlight.

The inventors therefore utilised a different form of technology to implement the object detection unit 50, namely a VCSEL device comprising a VCSEL 51. The VCSEL 51 is configured to provide a beam having a narrow focus and limited range. Such an arrangement was found to work well to cause the camera unit 60 and/or the microphone unit 55 to be activated only when a bird is at the perching area 25. In particular, using a VCSEL was found to be helpful for reducing or eliminating the environmental noise and false triggers that the conventional technologies struggled to cope with. For example, using a VCSEL was found not to accidentally trigger the camera unit 60 and/or microphone unit 55 if a bird is flying past the bird feeder 10 or if the bird feeder 10 is placed near a bush that is moving with the wind, for example.

The camera unit 60 may be any suitable imaging device for capturing image data a bird at the distance between the camera unit 60 and the perching area, such as an Omnivision™ OV5693 camera unit, which is a ¼-inch, 5-megapixel image sensor, delivering DSC-quality imaging and low-light performance as well as full 1080p high-definition video recording at 30 frames per second (fps).

The electronic control module 15 may comprise an image processing chipset for processing image data obtained from the camera unit 60. The image processing chipset may support an Internet Protocol (IP) Camera system on a chip (SoC) designed for low power consumption, high image quality, and powerful Edge AI computing. Such an image processing chipset may be capable of performing intelligent video analytics without additional cloud server computing power and supports versatile Convolutional Neural Network models to detect various pre-defined objects. The image processing chipset may be, for example, a Realtek™ RTS3916E chipset or any other suitable chipset known to the skilled person.

Image data may be provided to a remote processing device having artificial intelligence (AI), such as machine learning, capability. This enables automated detection of a species of bird by analysing the image data. The image data captured by the camera unit 60 may also be provided to a user device as part of an audio visual (AV) stream.

Figure 4:
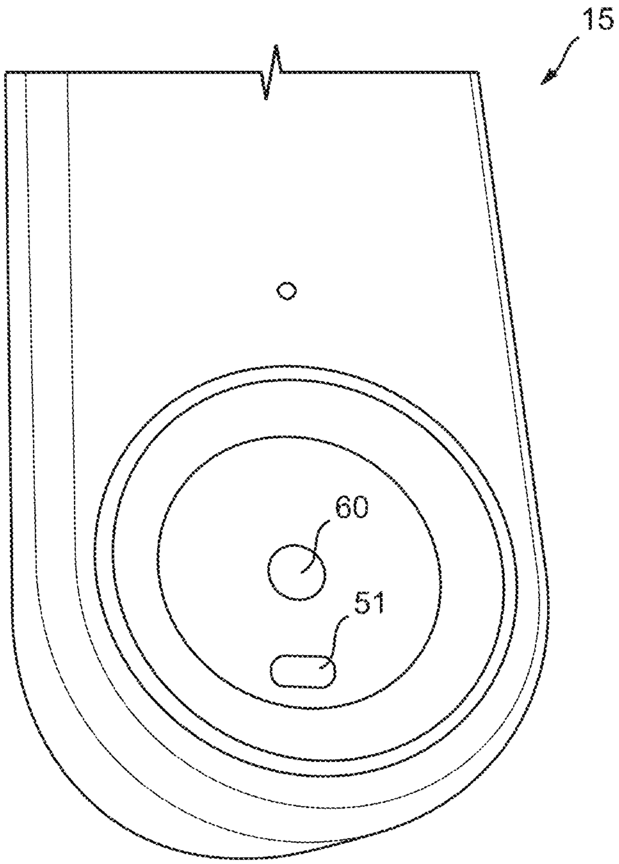
FIG. 4 is a close-up view of a portion of the electronic control module.

As shown in FIG. 4, the VCSEL 51 is located directly below the camera unit 60. This arrangement may be advantageous when the field of view of the VCSEL 51 is substantially similar to the field of view of the camera unit 60. Therefore, the camera unit 60 may be activated when an object is likely to be within the field of view of the camera unit 60.

The microphone unit 55 captures audio data from the environment of the bird feeder 10. Audio data may be provided to a remote device having AI (e.g. machine learning) capability. This can enable automated detection of a species of bird by analysing the birdsong. The audio data captured by the microphone unit 55 may also be provided to a user device as part of an audio visual (AV) stream.

The electronic control module 15 may, as in the present example embodiment, comprise a feed sensor arrangement 65 configured to detect a level of bird feed in the bird feed receptacle 21 of the bird feeder 10. The feed sensor arrangement 65 may be further configured to output a signal indicating a low feed level when the level of bird feed is determined to be below a threshold level. A low feed notification may be sent to a user device in response to the generation of the low feed signal.

The feed sensor arrangement 65 comprises one or more feed sensors. The feed sensors may be capacitive sensors configured to detect a presence of bird feed adjacent or near to the one or more capacitive sensors by reacting to a moisture content of the bird feed. Alternatively, the feed sensors may comprise one or more luminosity sensors configured to detect a luminosity level in the bird feed receptacle 21 to determine a presence of bird feed. For example, ambient light entering the bird feed receptacle 21 through a transparent portion thereof (or light from one or more light sources disposed at an opposite side of the bird feed receptacle 21 to the one or more luminosity sensors, for example) may be blocked by bird feed from reaching one or more luminosity sensors. The one or more luminosity sensors (and the transparent portion or the one or more light sources, as the case may be) may be positioned on the bird feed receptacle such that, when the bird feed level drops below a pre-determined level, the light reaches the luminosity sensor(s), and an output signal is generated thereby which triggers the controller 700 to send a low bird feed notification to a user device.

The electronic control module 15 may, as in the present example embodiment, comprise a Hall Effect sensor 70, which is configured to detect attachment and detachment of the electronic control module 15 from the bird station. The Hall Effect sensor 70 carries out this functionality by detecting the presence (and optionally a magnitude of a magnetic field) of a magnet provided in the recess 40 of the bird station. When the electronic control module 15 is inserted in the bird station, the Hall Effect sensor 70 detects the presence of the magnetic field of the magnet of the bird feeder 10. The Hall Effect sensor 70 may then generate and output an attachment signal to the controller 700. In response to receiving the attachment signal from the Hall Effect sensor 70, the controller 700 may activate components of the electronic control module 15, such as the object detection unit 50 and the feed sensor arrangement 65. When the electronic control module 15 is removed from the bird station, the Hall Effect sensor 70 no longer detects the magnet of the bird feeder and therefore determines that the electronic control module 15 has been detached from the bird station. The Hall Effect sensor 70 may then generate and output a detachment signal to the controller 700. In response to receiving the detachment signal, the controller 700 may accordingly de-activate components of the electronic control module 15, such as the object detection unit 50 and the feed sensor arrangement 65.

The electronic control module 15 may, as in the present example embodiment, comprise a wireless communication unit 75. The wireless communication unit 75 may be configured to communicate via one or more suitable wireless communication protocols, such as Wi-Fi and/or Bluetooth. Additionally or alternatively, the wireless communication unit 75 may be configured to communicate via a cellular connection such as 3G, 4G or 5G. The wireless communication unit 75 is used to communicate with a remote user device. Notifications, such as bird detection notifications or low feed notifications, may be sent to the user device. Audio and video streams obtained from the microphone unit 55 and the camera unit 60 may be transmitted to the user device by the wireless communication unit 75. The wireless communication unit 75 may operate using Wi-Fi in the 2.4 GHz range since this range achieves a good performance through thick building materials, like walls. The electronic control module 15 comprises an antenna 76 for transmitting signals generated by the wireless communication unit 75.

The audio and/or video streams may be sent to a remote device having a machine learning capability. The audio and/or video streams may be processed using a suitable machine learning algorithm to determine a species of bird present at the bird station. After a determination of the bird species has been made, this determination may be output to a user device.

In addition to the above mentioned activation of the microphone unit 55 and/or camera unit 60 in response to an object detection by the object detection unit 50, in some embodiments a user may activate the microphone unit 55 and/or camera unit 60 using a remote device (not shown). The remote device may be provided with a user interface, for example a graphical user interface, enabling a user to activate the microphone unit 55 and/or the camera unit 60. An activation signal activating the microphone unit 55 and/or an activation signal activating the camera unit 60 may be sent from the remote device to the wireless communication unit 75. The controller 700 may then activate the microphone unit 55 and/or the camera unit 60. Audio and/or video streams may then be sent from the wireless communication device 75 to the remote device.

The controller 700 is configured to co-ordinate operations carried out by the various components of the electronic control module 15, for example activating and de-activating various components of the electronic control module 15 in response to particular conditions being satisfied, as described herein. For example, the controller 700 may receive a signal from the object detection unit 50 indicating that an object is present in the perching area 25. In response to receiving this signal, the controller 700 activates the camera unit 60 and/or the microphone unit 55. Additionally or alternatively, The controller 700 may receive a low feed level signal form the feed sensor arrangement 65 indicating that the feed level has dropped below the threshold level. In response to receiving the low feed level signal, the controller 700 may cause the wireless communication unit 75 to send a low feed level notification to a user device. Additionally or alternatively, the controller 700 may receive an attachment signal from the Hall Effect sensor 70 indicating that the electronic control module 15 has been attached to the bird station. In response to receiving the attachment signal, the controller 700 may activate the object detection unit 50 and the feed sensor arrangement 65. Additionally or alternatively, the controller 700 may receive a detachment signal from the Hall Effect sensor 70 indicating that the electronic control module 15 has been detached from the bird station. In response to receiving the detachment signal, the controller 700 may de-activate the object detection unit 50 and the feed sensor arrangement 65. As explained above, in some embodiments, the controller 700 may activate the microphone unit 55 and/or the camera unit 60 in response to the wireless communication unit receiving an activation signal from a remote device.

The electronic control module 15 may, as in the present example embodiment, have a physical control button 80 that may be used for powering the electronic control module 15 on and off (with a short press, for example), placing Bluetooth (where employed by the wireless communication unit 75) in pairing mode (with a 3 second press, for example), and/or performing a factory reset on the electronics (with a 10 second press, for example).

The electronic control module 15 may, as in the present example embodiment, comprise a temperature sensor 85 that can be used to help protect the electronics by enabling a shut down in extreme temperatures. The temperature sensor 85 can also be used by the controller 700 to provide a temperature measurement to a user device.

The electronic control module 15 may, as in the present example embodiment, comprise a port, such as a USB-C Connector 90. The USB-C connector 90 on the electronic control module 15 can be used for charging the electronic control module 15. The electronic control module 15 can be removed from the bird station prior to charging to make this more convenient. A cable may be routed through the bird feeder 10 to power the electronic control module 15 permanently via a USB-C cable. In example embodiments where the roof 30 comprises one or more solar panels, the solar panels can be plugged in via the USB-C Connector 90 and used to recharge the battery when exposed to daylight.

The electronic control module 15 may, as in the present example embodiment, comprise a rechargeable battery 95. The rechargeable battery 95 may, for example, be a 3800 mAh rechargeable lithium ion battery pack, which has been found to work well in the operational temperature range of the electronic control module 15, or any other suitable battery. The battery 95 may be provided with a charge sensor 100 which can determine the level of charge of the battery. The level of charge may be displayed and/or notified to a user device in a notification from the wireless communication unit 75.

Figure 5:
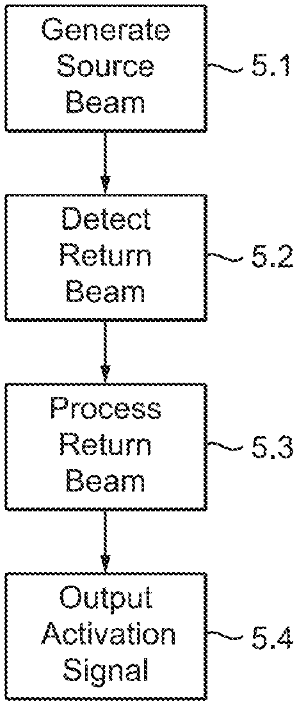
FIG. 5 is a flow chart illustrating operations carried out by an object detection unit of the electronic control module.

FIG. 5 is a flow a chart illustrating exemplary operations carried out by the object detection unit 50. At step 5.1, the VCSEL 51 generates a source beam directed towards the perching area 25 of a bird station such as the bird feeder 10 or bird bath 35. At step 5.2, the object detection unit 50 detects a return beam reflected from an object.

At step 5.3, the object detection unit 50 processes a detection/measurement of the return beam (e.g. an electronic signal that is indicative of measured light intensity of the return beam or a phase shift of the return light beam relative to a reference beam) to determine whether there is an object located in the perching area of the bird station.

Figure 6:
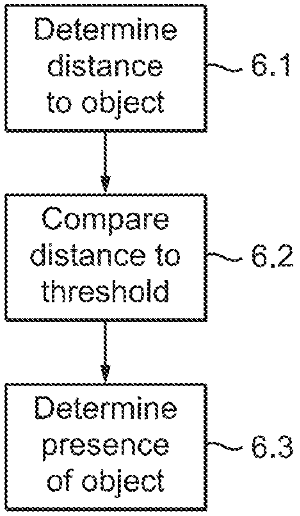
FIG. 6 is a flow chart illustrating operations carried out by the object detection unit of the electronic control module to process the detection of the return beam.

FIG. 6 is a flow chart illustrating exemplary operations carried out by the object detection unit 50 and, in particular, a processor 52 of the object detection unit 50 to process the detection of the return beam. At step 6.1, the processor 52 determines a distance of the object from the object detection unit 50. The distance to the object may be determined by calculating a time of flight of a pulse of the light beam for the round trip between the object detection unit 50 and the object. The distance may then be determined using the expression:

$$d=(c\times\Delta t)/2$$

where d is the distance from the object detection unit 50 to the object, c is the speed of light and Δt is the time of flight.

At step 6.2 of FIG. 6, the processor 52 compares the distance to the object to a threshold distance. At step 6.3, processor 52 determines that there is an object located in the perching area 25 of the bird station if the distance to the object from the object detection unit 50 is smaller than the threshold distance. Various settings of the object detection unit 50 may be selectable by a user. The threshold distance may be selectable so that a user can vary the sensitivity of the object detection unit 50. For example, a threshold distance of 10 cm may be set so that only objects that are within 10 cm of the object detection unit 50 trigger activation of the camera unit 60 and/or microphone unit 55. A higher threshold distance may, however, be set. For example, it may be desirable to set a higher threshold distance if the electronic control module 15 is to be fitted to the bird bath 35 as compared to the bird feeder 10 since the perching area of the bird bath 35 extends a greater distance away from the electronic control module 15.

Returning to FIG. 5, after processing the detection/measurement of the return beam to determine whether there is an object located in the perching area of the bird station, the process continues to step 5.4. At step 5.4, in response to receiving an indication from the processor 52 that there is an object located in the perching area of the bird station, the controller 700 outputs an activation signal to the camera unit 60 and/or the microphone unit 55.

The camera unit 60 and/or the microphone unit 55 is/are activated in response to receiving an activation signal from the controller 700. The camera unit 60 and/or microphone unit 55 may then be operable to capture image data and/or audio data from the perching area 25 of the bird station. The image data and/or audio data may then be output, via the wireless communication device 75, to a remote device provided with a machine learning functionality in order to identify a species of bird present at the bird station. Furthermore, the video and/or audio stream may be provided to a user device.

Figure 7:
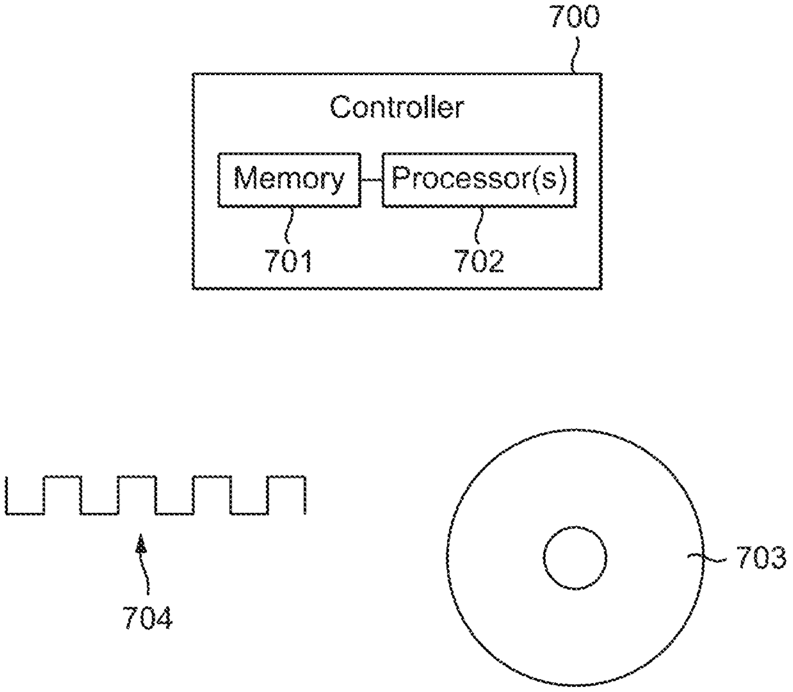
FIG. 7 is a schematic block diagram of a computing device which implements the functionality of the controller of the example embodiment.

The electronic control module 15 comprises several components, such as the object detection unit 50, the microphone unit 55, the camera unit 60, the feed sensor arrangement 65, the Hall Effect sensor 70 and the wireless communication unit 75, having computing capabilities that require a processor and memory. The processor and memory resources provided for these components may be provided as part of those individual components. However, some or all of the processor and memory resources required by those components may be provided by the controller 700. FIG. 7 is a schematic block diagram of the controller 700. The controller 700 comprises a memory 701 and one or more processors 702. The memory 701 includes working memory (e.g. a random access memory) and an instruction store storing code defining a computer program including computer-readable instructions which, when executed by the one or more processors 702, cause the one or more processors 702 to perform the processing operations described herein. The instruction store may include a ROM (e.g. in the form of an electrically-erasable programmable read-only memory (EEPROM) or flash memory) which is pre-loaded with the computer-readable instructions. Alternatively, the instruction store may include a RAM or similar type of memory, and the computer-readable instructions can be input thereto from a computer program product, such as a computer-readable storage medium such as a CD-ROM 703 etc. or a computer-readable signal 704 carrying the computer-readable instructions.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

Further, the purpose of the Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that any procedures recited in the claims need not be performed in the order presented.

While this specification contains many specific embodiment details, these should not be construed as limitations on the scope of any inventions or of what may be claimed, but rather as descriptions of features specific to particular embodiments described herein. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Having now described some illustrative embodiments and embodiments, it is apparent that the foregoing is illustrative and not limiting, having been presented by way of example. In particular, although many of the examples presented herein involve specific combinations of apparatus or software elements, those elements may be combined in other ways to accomplish the same objectives. Acts, elements and features discussed only in connection with one embodiment are not intended to be excluded from a similar role in other embodiments or embodiments.

What is claimed is:

1. A system comprising:

an electronic control module; and a plurality of bird stations, wherein a first bird station of the plurality of bird stations is one of a bird feeder, a bird bath, and a bird nesting box and a second bird station of the plurality of bird stations is another one of the bird feeder, the bird bath, and the bird nesting box;

wherein each bird station comprises:

a housing having a recess configured to receive the electronic control module; and one or more solar panels mounted on the bird station and detachably connectable to the electronic control module, wherein the one or more solar panels are configured to provide electrical power to the electronic control module when the electronic control module is in the recess and connected to the one or more solar panels.

2. The system of claim 1, wherein the one or more solar panels of each bird station are detachably connectable to the electronic control module by an electrical cable.

3. The system of claim 1, wherein each bird station further comprises a roof, and the one or more solar panels of each bird station are positioned on the roof.

4. The system of claim 1, wherein a third bird station of the plurality of bird stations is another one of the bird feeder, the bird bath, and the bird nesting box.

5. The system of claim 1, wherein the recess comprises a magnet to assist in retaining the electronic control module in the recess when the electronic control module has been inserted into the recess.

6. The system of claim 1, wherein the electronic control module comprises a rechargeable battery which is arranged to be charged by the one or more solar panels when the electronic control module has been inserted into the recess of the housing of the bird station and the one or more solar panels of the bird station are connected to the electronic control module.

7. A system comprising:

an electronic control module; and a bird station comprising:

a housing having a recess configured to receive the electronic control module; and one or more solar panels mounted on the bird station and detachably connectable to the electronic control module, wherein the one or more solar panels are configured to provide electrical power to the electronic control module when the electronic control module is in the recess and connected to the respective one or more solar panels, wherein the electronic control module comprises:

a controller; and a Hall Effect sensor operable to detect an attachment of the electronic control module to the bird station, wherein the controller is operable to activate one or more components of the electronic control module in response to the Hall Effect sensor detecting the attachment.

8. The system of claim 7, wherein the Hall Effect sensor is further operable to detect a detachment of the electronic control module from the bird station, and the controller is further operable to de-activate the one or more components of the electronic control module in response to the Hall Effect sensor detecting the detachment.

9. A system comprising:

an electronic control module; and a bird station comprising:

a housing having a recess configured to receive the electronic control module, wherein the recess comprises a magnet to assist in retaining the electronic control module in the recess when the electronic control module has been inserted into the recess, and one or more solar panels mounted on the bird station and detachably connectable to the electronic control module, wherein the one or more solar panels are configured to provide electrical power to the electronic control module when the electronic control module is in the recess and connected to the respective one or more solar panels, wherein the electronic control module comprises:

a controller; and a Hall Effect sensor operable to detect an attachment of the electronic control module to the bird station, wherein the controller is operable to activate one or more components of the electronic control module in response to the Hall Effect sensor detecting the attachment.

10. The system of claim 9, wherein the Hall Effect sensor is operable to detect the attachment of the electronic control module to the bird station by detecting the magnet in the recess of the housing of the bird station.

11. The system of claim 9, wherein the Hall Effect sensor is operable to detect a detachment of the electronic control module from the bird station by not detecting the magnet in the recess of the housing of the bird station.

12. A system comprising:

an electronic control module; and a bird station comprising:

a housing having a recess configured to receive the electronic control module; and one or more solar panels mounted on the bird station and detachably connectable to the electronic control module, wherein the one or more solar panels are configured to provide electrical power to the electronic control module when the electronic control module is in the recess and connected to the respective one or more solar panels, wherein the bird station further comprises a perching area, the electronic control module comprising an object detection unit arranged to detect an object located in the perching area of the bird station when the electronic control module has been inserted into the recess of the bird station.

13. A system comprising:

an electronic control module; and a bird station comprising:

a housing having a recess configured to receive the electronic control module; and one or more solar panels mounted on the bird station and detachably connectable to the electronic control module, wherein the one or more solar panels are configured to provide electrical power to the electronic control module when the electronic control module is in the recess and connected to the respective one or more solar panels, wherein the bird station further comprises a bird feed receptacle for storing bird feed, the electronic control module comprising a feed sensor arrangement arranged to detect a level of bird feed in the bird feed receptacle of the bird station when the electronic control module has been inserted into the recess of the bird station.

14. The system of claim 12, wherein the electronic control module comprises:

a controller; and a Hall Effect sensor operable to detect an attachment of the electronic control module to the bird station, wherein the controller is operable to activate the object detection unit of the electronic control module in response to the Hall Effect sensor detecting the attachment.

15. The system of claim 13, wherein the electronic control module comprises:

a controller; and a Hall Effect sensor operable to detect an attachment of the electronic control module to the bird station, wherein the controller is operable to activate the feed sensor arrangement of the electronic control module in response to the Hall Effect sensor detecting the attachment.

* * * * *